(12) United States Patent
Harris et al.

(10) Patent No.: US 7,071,994 B2
(45) Date of Patent: Jul. 4, 2006

(54) SYSTEM AND METHOD FOR NONDISRUPTIVELY EMBEDDING AN OFDM MODULATED DATA SIGNAL INTO A COMPOSITE VIDEO SIGNAL

(75) Inventors: Frederic Joel Harris, Lemon Grove, CA (US); Robert W. Lowdermilk, San Diego, CA (US); Dragan Vuletic, San Diego, CA (US); Steven C. Weiss, San Jose, CA (US)

(73) Assignee: Telisar Corporation, San Mateo, CA (US)

( * ) Notice: Subject to any disclaimer, the term of this patent is extended or adjusted under 35 U.S.C. 154(b) by 613 days.

(21) Appl. No.: 09/909,760

(22) Filed: Jul. 19, 2001

(65) Prior Publication Data

US 2002/0085118 A1    Jul. 4, 2002

Related U.S. Application Data

(60) Provisional application No. 60/259,994, filed on Jan. 4, 2001.

(51) Int. Cl.
*H04N 7/08* (2006.01)
(52) U.S. Cl. .................................................. 348/473
(58) Field of Classification Search ........ 348/473–479, 348/516, 525, 521, 723; 375/316, 340, 260, 375/362, 364, 365; 370/203, 204, 206, 343
See application file for complete search history.

(56) References Cited

U.S. PATENT DOCUMENTS

| | | | | |
|---|---|---|---|---|
| 3,795,763 A | * | 3/1974 | Golding et al. | 375/240.01 |
| 5,321,514 A | * | 6/1994 | Martinez | 725/62 |
| 5,371,548 A | * | 12/1994 | Williams | 348/478 |
| 5,425,050 A | * | 6/1995 | Schreiber et al. | 375/141 |
| 5,608,764 A | * | 3/1997 | Sugita et al. | 375/344 |
| 5,771,224 A | * | 6/1998 | Seki et al. | 370/206 |
| 5,815,212 A | * | 9/1998 | Edwards et al. | 348/501 |
| 5,956,318 A | * | 9/1999 | Saeki | 370/206 |
| 6,009,073 A | * | 12/1999 | Kaneko | 370/203 |
| 6,314,083 B1 | * | 11/2001 | Kishimoto et al. | 370/210 |
| 6,433,835 B1 | * | 8/2002 | Hartson et al. | 348/608 |
| 6,441,871 B1 | * | 8/2002 | Hori et al. | 348/691 |
| 6,563,880 B1 | * | 5/2003 | Hunsinger et al. | 375/260 |
| 6,611,493 B1 | * | 8/2003 | Miyashita et al. | 370/208 |
| 6,731,624 B1 | * | 5/2004 | Maekawa et al. | 370/350 |
| 6,762,991 B1 | * | 7/2004 | Hirakura et al. | 370/203 |
| 6,788,349 B1 | * | 9/2004 | Wu et al. | 348/473 |

* cited by examiner

*Primary Examiner*—Paulos M. Natnae
(74) *Attorney, Agent, or Firm*—Victoria S. Kolakowski; Michael W. Landry

(57) ABSTRACT

A method and system for sending and receiving binary bit stream in a composite video signal, such as a NTSC signal. The binary bit stream is modulated according to quadrature amplitude modulation, converted to analog and translated to an intermediate frequency relative to the composite video signal and the associated sync pulses, and combined with the composite video signal. At reception of a composite video signal that includes the modulated bit stream, the sync pulses of the composite video signal are determined by extracting the composite video signal from the modulated bit stream. Also, the modulated bit stream is extracted from the composite video signal, separated into its component parts based on the sync pulses, and combined into a binary bit stream.

22 Claims, 13 Drawing Sheets

Diagram of Modulator Signal processing Blocks and Signal Flow at Transmitter

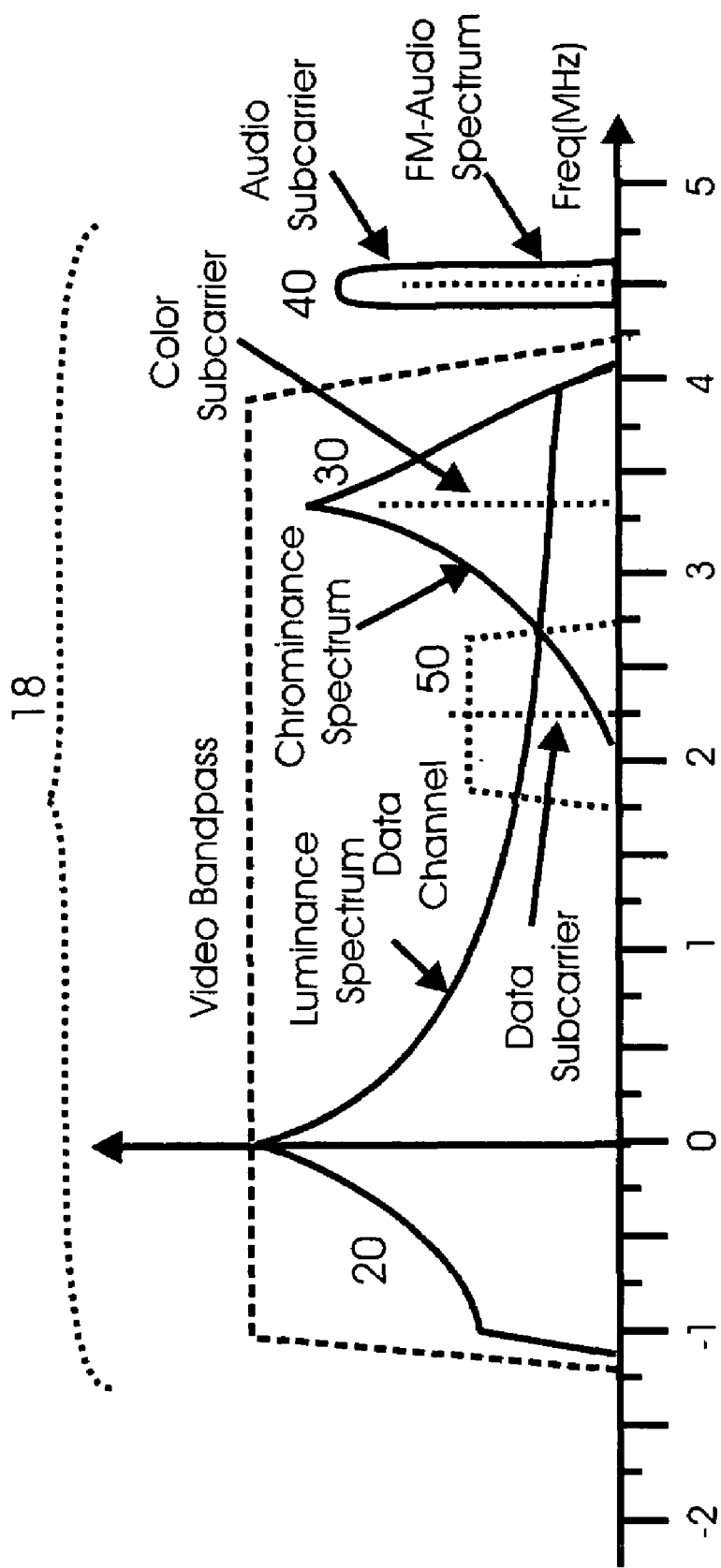
Figure 1. Spectrum of Standard NTSC Signal with Overlay Data Channel

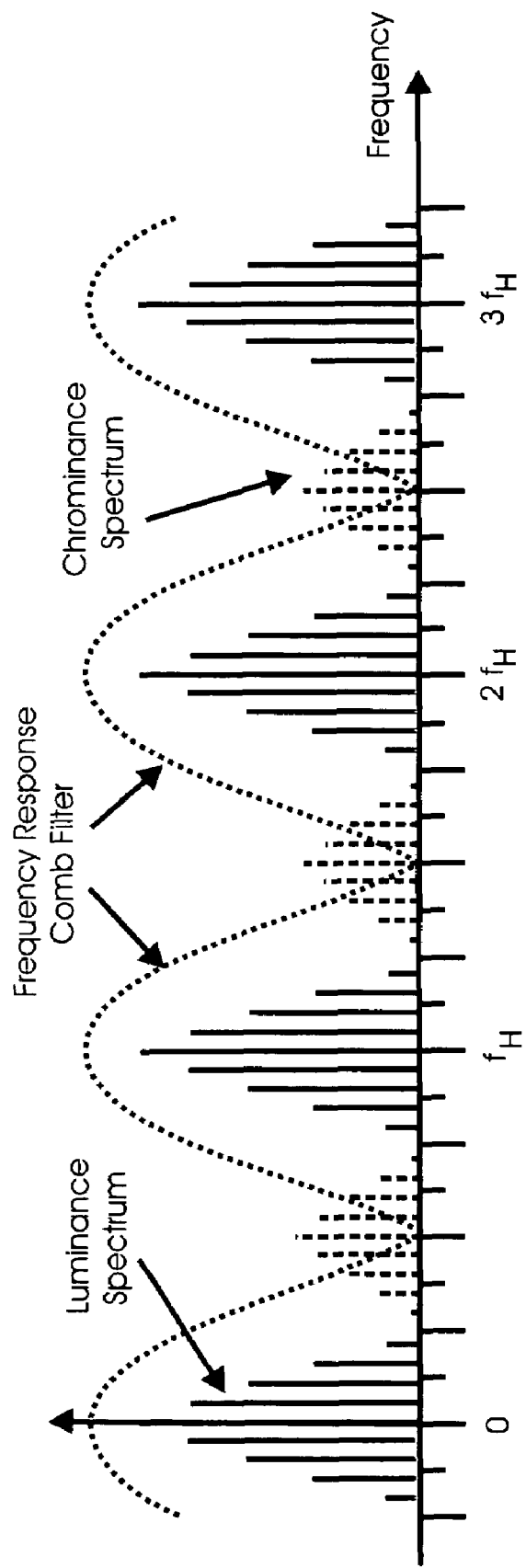
Figure 2. Luminance and Chrominance Spectral Clusters at Multiples of Horizontal Line Frequency and Comb Filter Frequency response that Passes Luminanance Spectrum

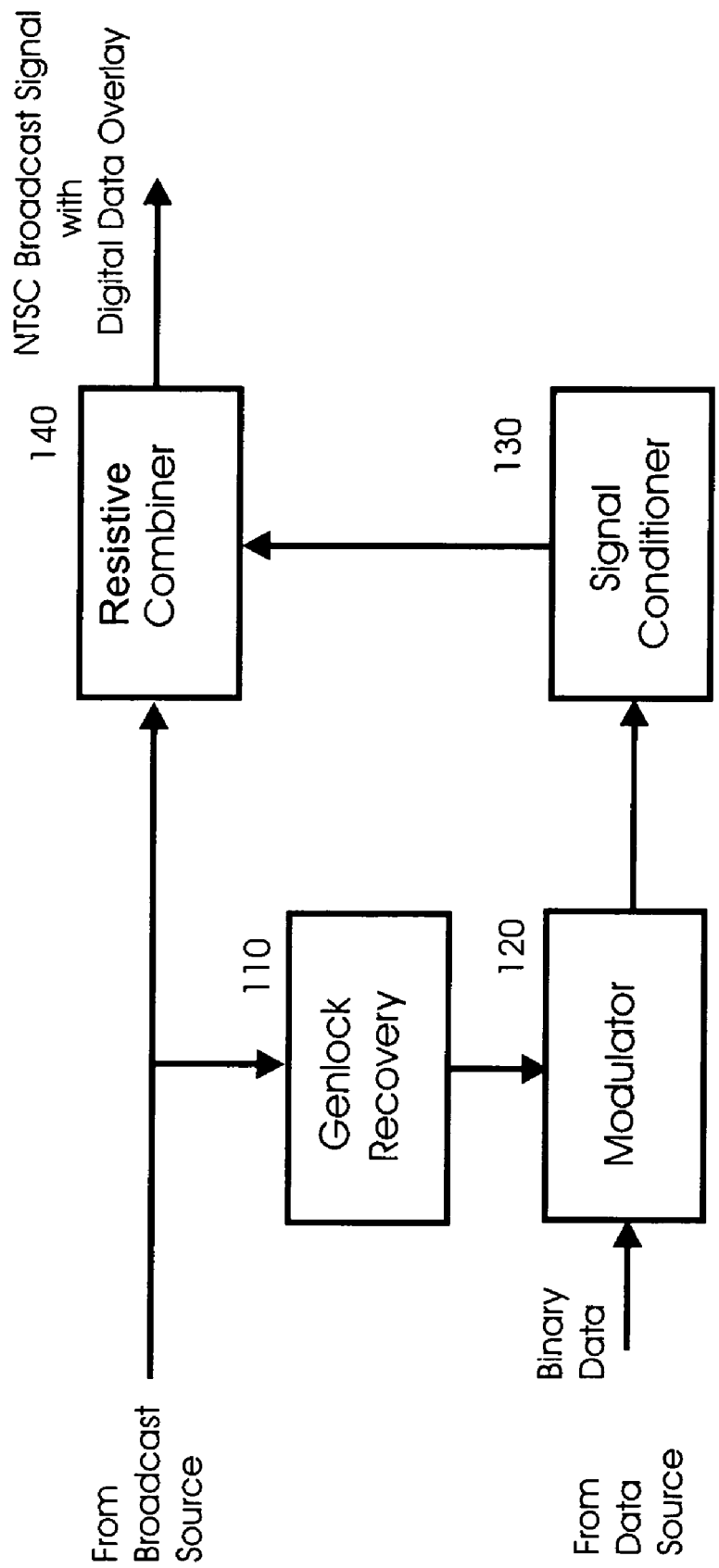
Figure 3. Diagram of Modulator Signal processing Bocks and Signal Flow at Transmitter

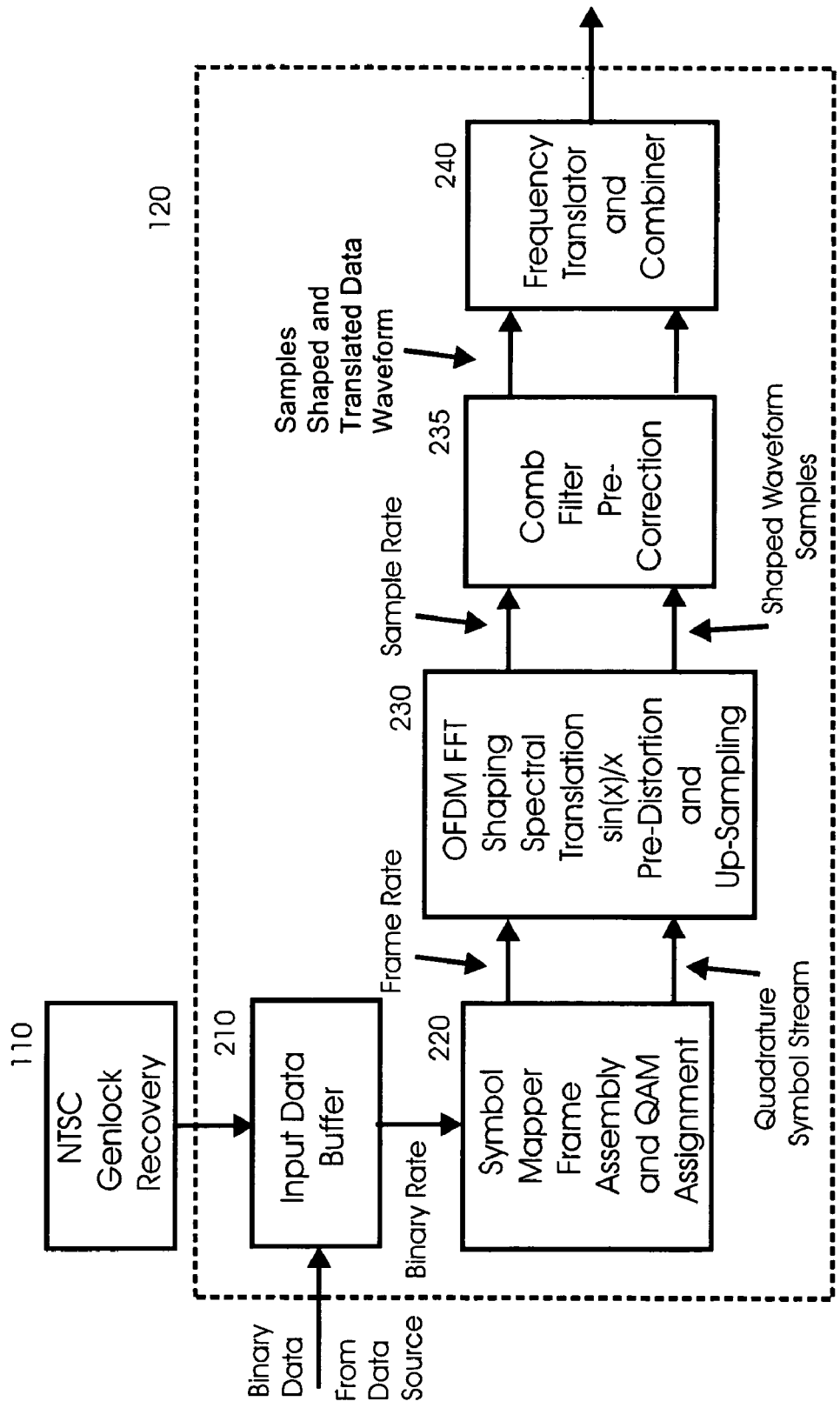
Figure 4. Digital Data Modulator

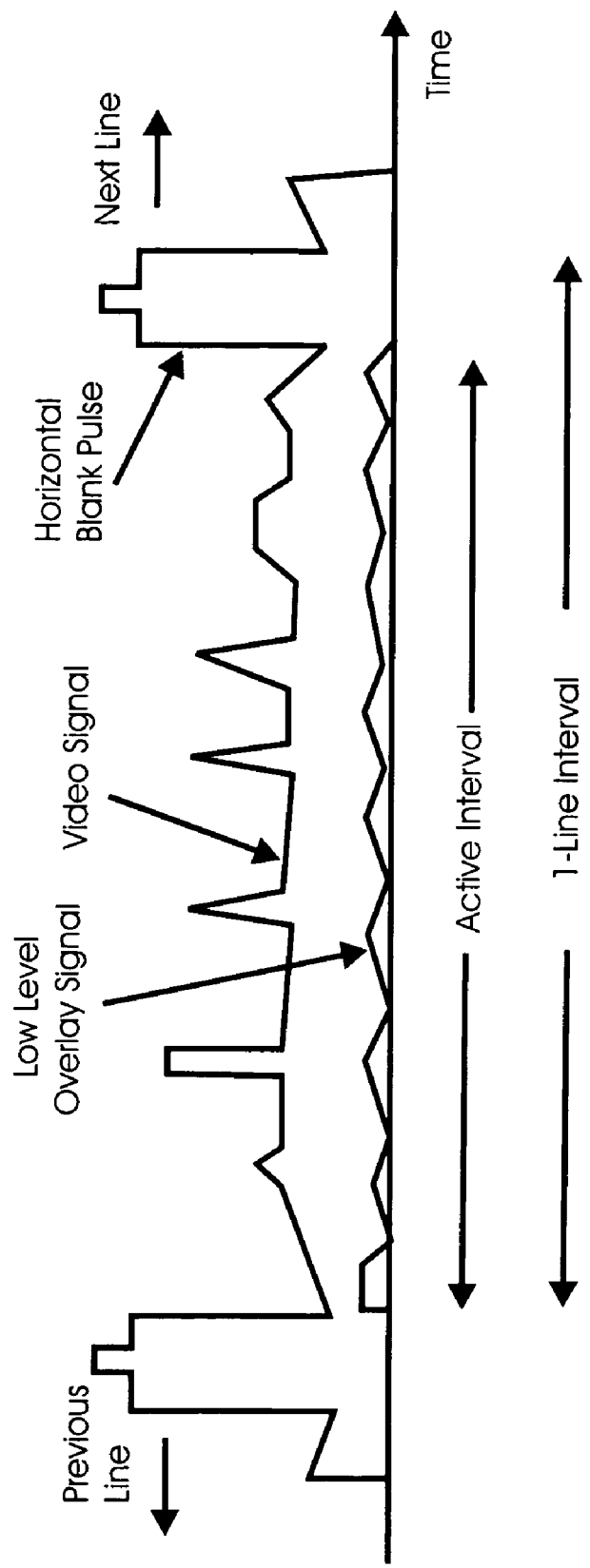
Figure 5. Time Domain Representation of NTSC Horizontal Line Interval Showing Temporal Location of low level OFDM Modulated Data Signal

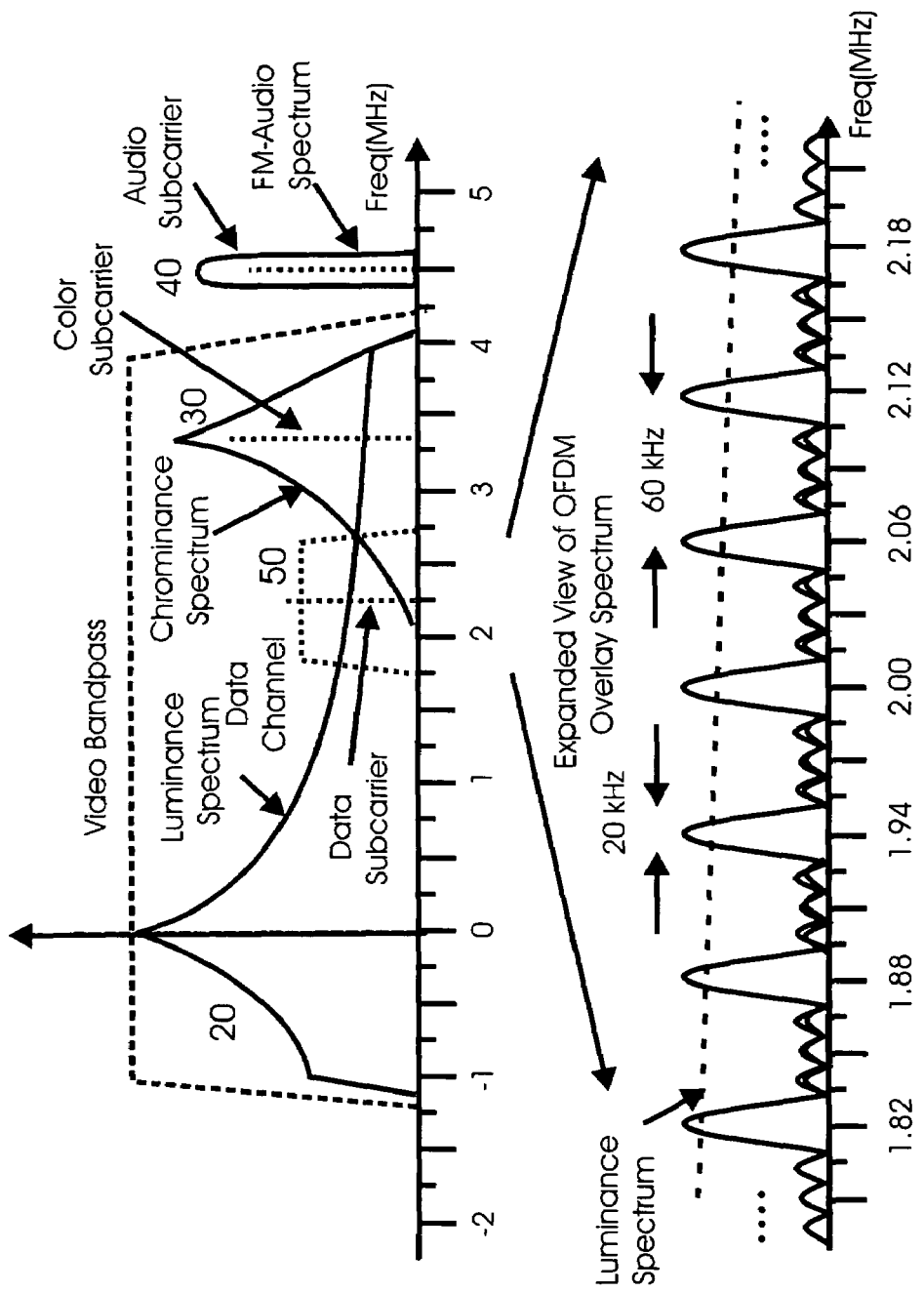
Figure 6. Typical Structure of Modified OFDM Overlay Signal Seen in Expanded Spectral Region Occupied by Data Channel

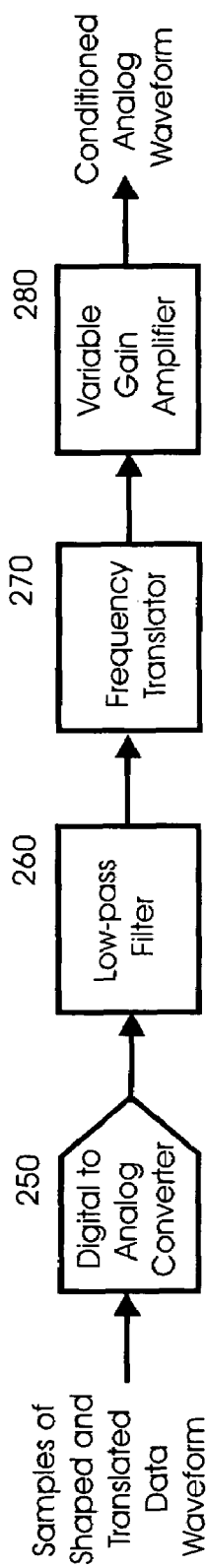
Figure 7. Analog Signal Conditioning Block
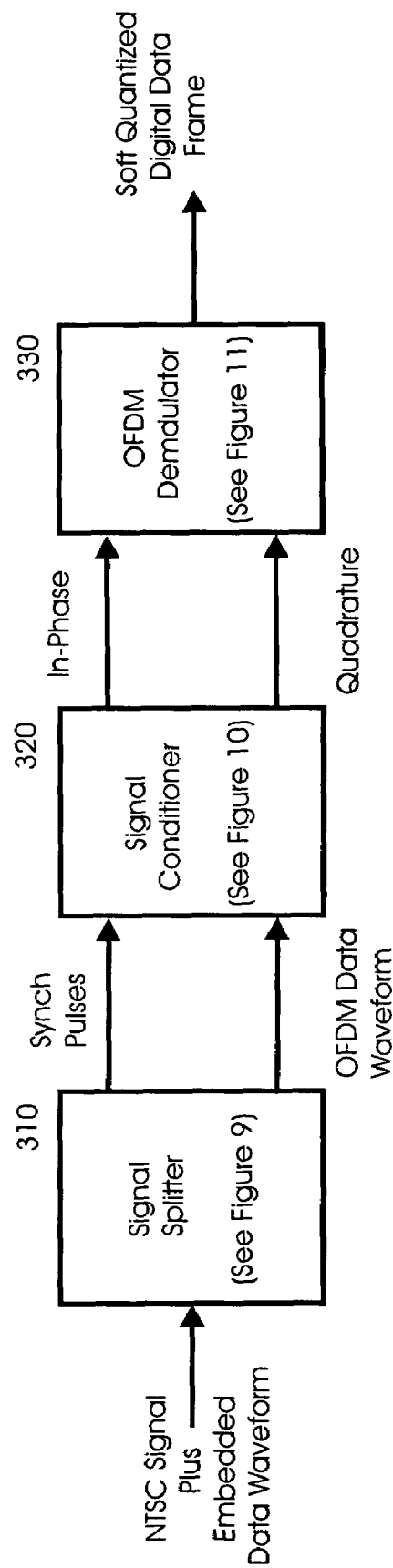
Figure 8. Data Demodulator Signal Flow

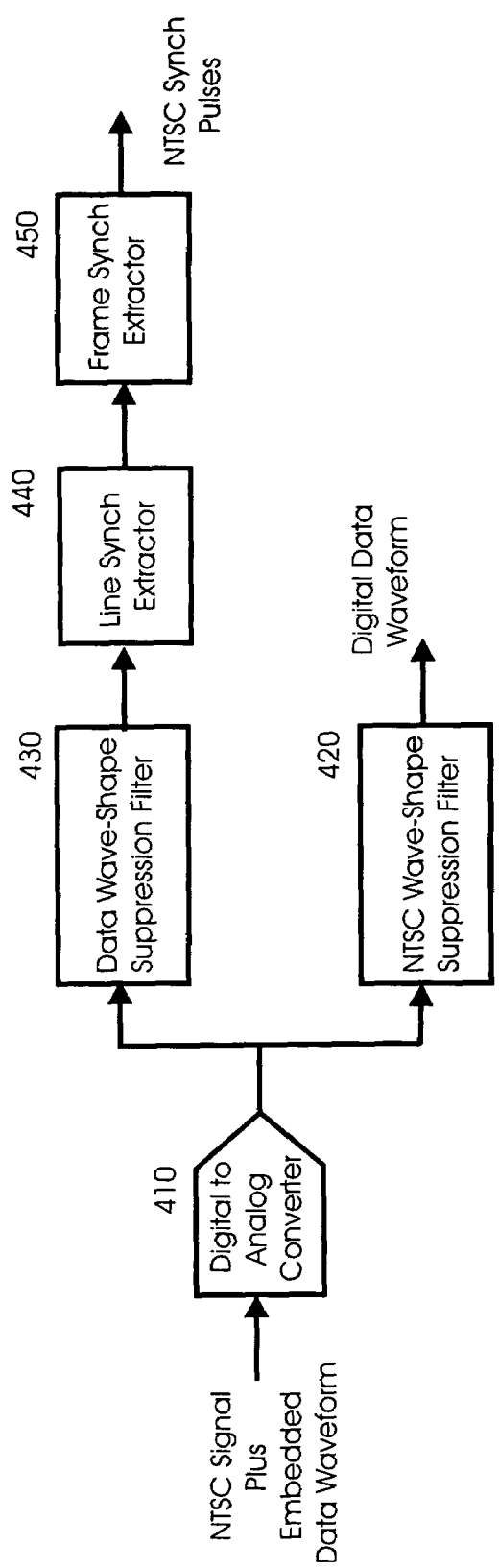
Figure 9. Signal Splitter

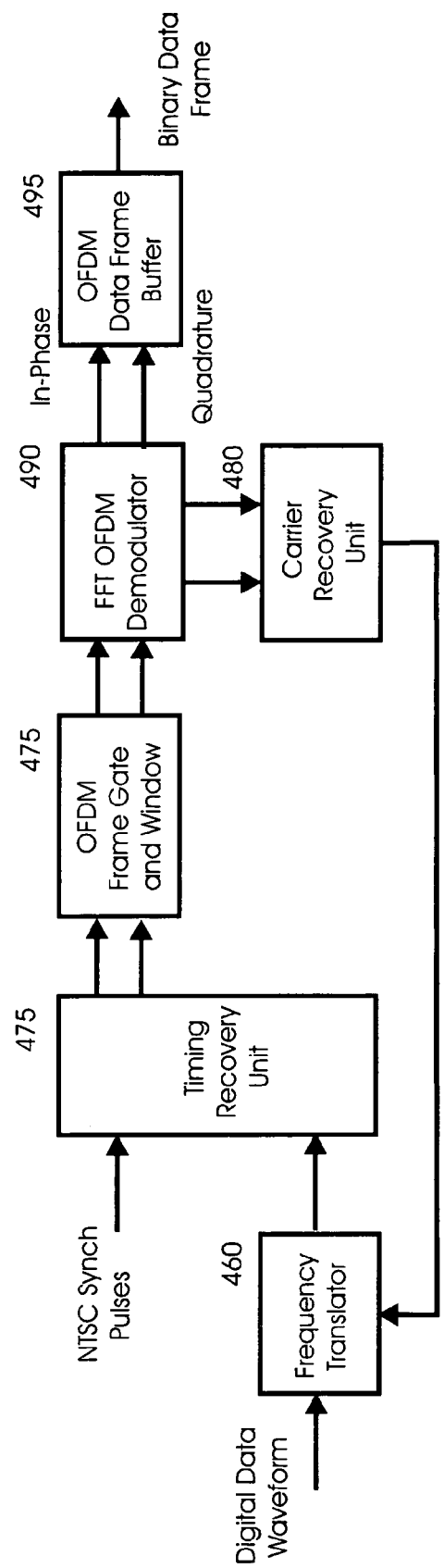
Figure 10. Signal Demodulator

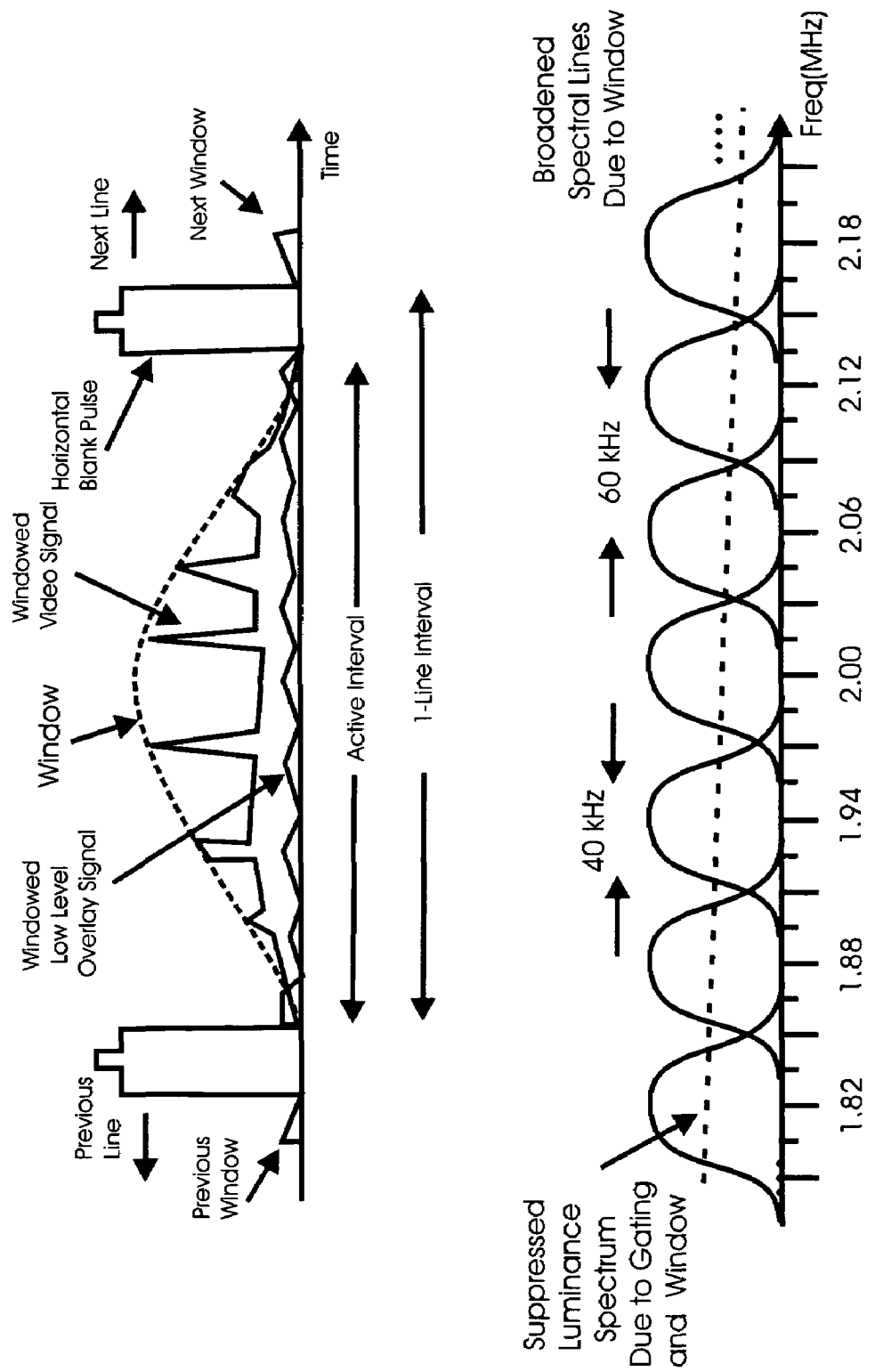
Figure 11. Time and Frequency Domain Effects of Gating and Windowing Active Line Interval Containing Overlaid OFDM Signal

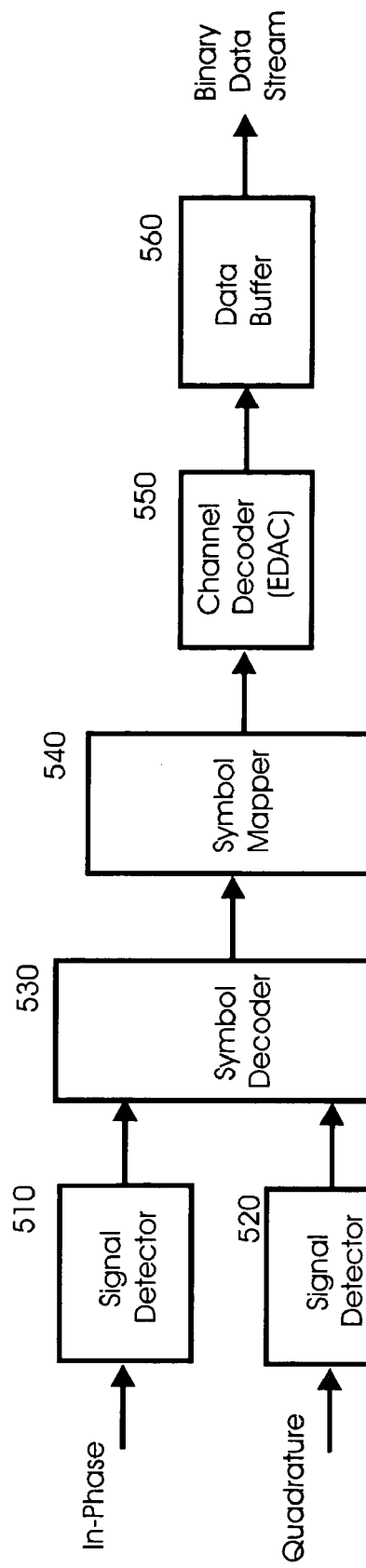
Figure 12. Data Detector and Decoder

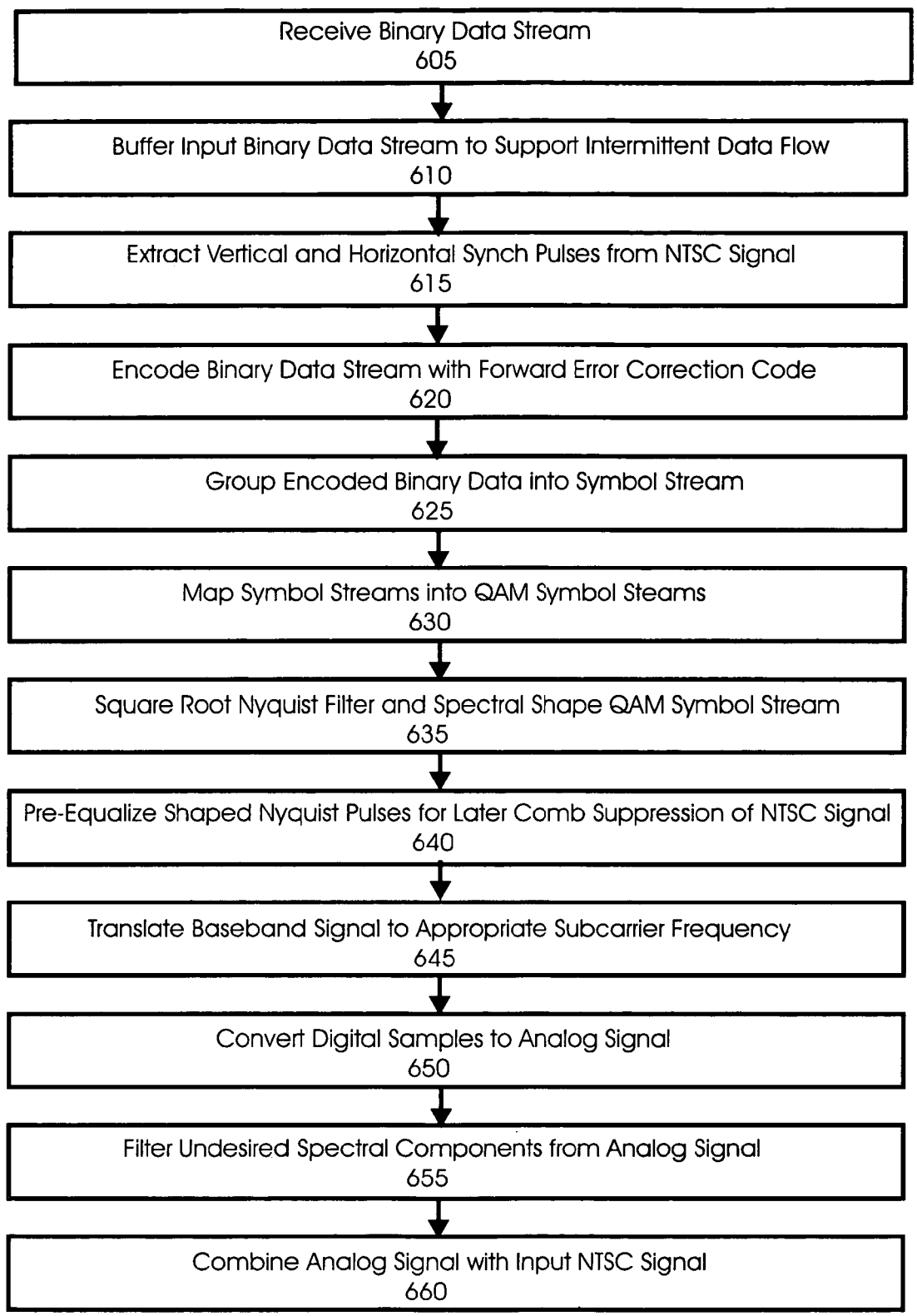
Figure 13. Signal Processing Flow through Modulator

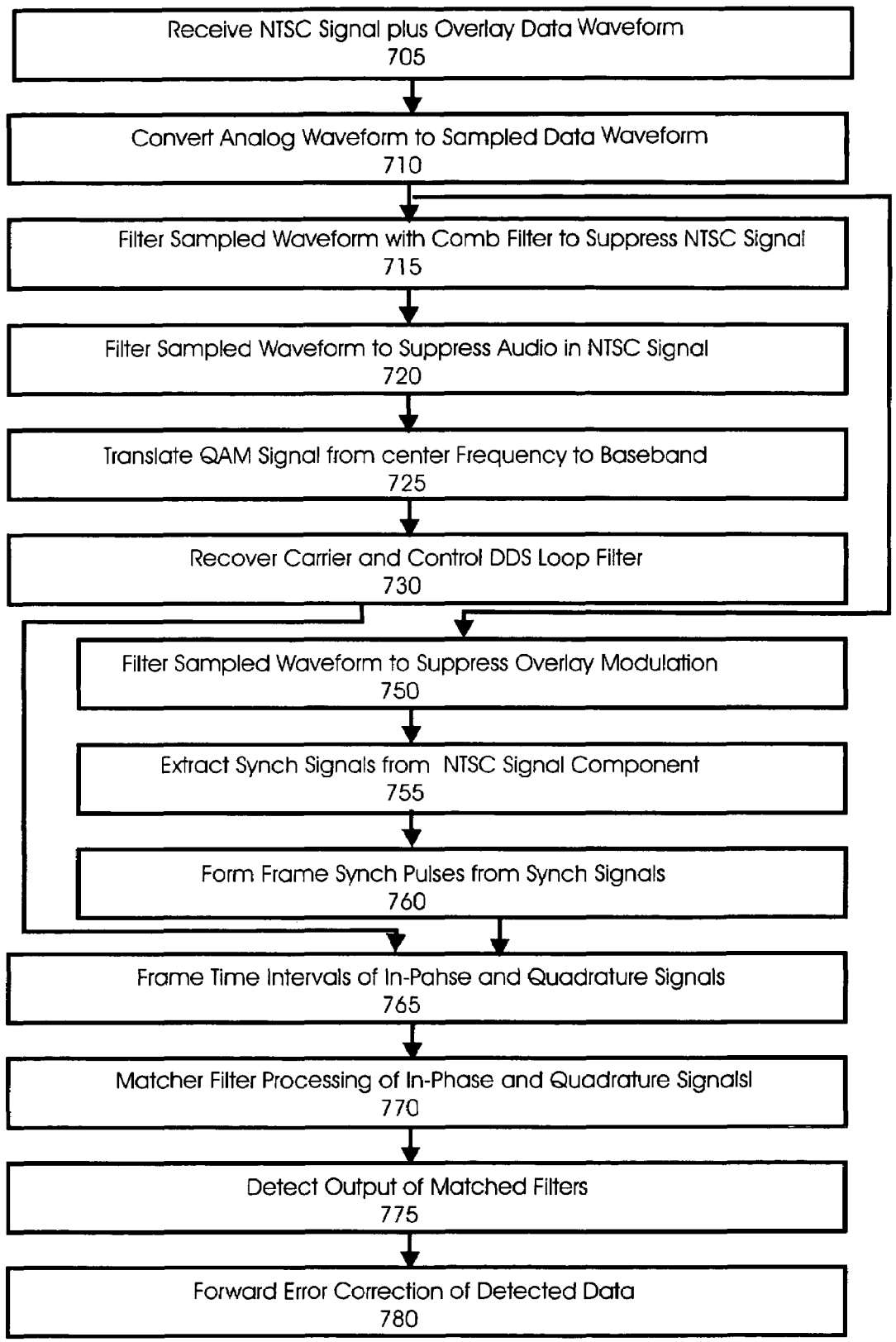
Figure 14. Signal Processing Flow through Demodulator

SYSTEM AND METHOD FOR NONDISRUPTIVELY EMBEDDING AN OFDM MODULATED DATA SIGNAL INTO A COMPOSITE VIDEO SIGNAL

PRIORITY OF INVENTION

This application claims priority of provisional application 60/259,994, "Imbedded Modulation in an NTSC Signal," filed Jan. 4, 2001, which is incorporated herein in its entirety.

FIELD OF THE INVENTION

This invention enables the insertion of an independent, high speed, digital data stream as an overlay to a standard NTSC (National Television Standards Committee) composite television signal.

BACKGROUND OF THE INVENTION

The NTSC television signal is composed of multiple simultaneous signals delivering the luminance and chrominance components of a sequence of images, called frames, that are interpreted by the eye and brain as a moving picture. An NTSC television signal delivers the sequence of pictures to the screen at a rate of 59.94/2 frames per second. The detailed signal structure contains attributes and components related to the process of displaying an image via a raster scan of a cathode ray imaging vacuum tube. There are a total of 525 raster, or scan lines, in a frame. The line rate for an NTSC signal, the product of frame rate and line rate, is 15,734.27 lines per second. The period of the line scan is approximately 63.56 microseconds. The periodicity of the horizontal line presentation rate is core to much of the signal structure of the NTSC signal and of the signal structure and processing described in this invention. The horizontal line rate is traditionally denoted $f_H$.

The frame is partitioned into two interleaved fields. The first of the interleaved fields contains the intensity function of the 262.5 even indexed lines, while the second field contains the intensity function of the 262.5 odd indexed lines. The lines are formed by scanning each image with a periodic, left to right, linear displacement of a light intensity detector that converts the light intensity at each equivalent pixel location to an output current and proportional output voltage. At the end of each line scan, the light intensity detector must retrace right to left in preparation for the next scan. The horizontal retrace time interval is approximately 10.2 microseconds or 16 percent of the line interval. The horizontal retrace time interval contains no image information but contains the horizontal blanking pulse, the black intensity reference level, the horizontal synchronization pulse, and the color oscillator burst reference signal.

The periodic scanning of the horizontal lines converts to a raster scan of the image by a top to bottom, linear displacement of successive line positions. The oscillator that performs the vertical displacement of successive lines must exhibit a retrace from bottom to top in preparation for the horizontal scan of the next field. There are two vertical retrace intervals per frame, one for each field. The total vertical retrace time interval is nominally 42 horizontal lines, which represents 8 percent of the frame. The vertical retrace interval for each frame contains 21 horizontal line scans. This block of horizontal line scans is called the vertical blank interval (VBI). The vertical retrace time interval contains no image information but contains the vertical blanking pulse, the black intensity reference level, the horizontal synchronization pulses, the vertical synch synchronization pulses, and equalizing pulses to permit the synch extraction circuitry for the vertical oscillator to ignore the half scan line difference in the final line scan that distinguishes successive frames.

The color sub carrier is located at a frequency considerably offset from base band so that the color modulation added to the gray scale luminance signal has a high temporal frequency, hence a high spatial frequency when displayed on the raster scanned image. The high spatial frequency is desired because the eye and brain will ignore high spatial frequency perturbations of intensity in the image. The specific frequency of the color sub carrier is located at an odd multiple of the half-line rate so that the oscillator experiences a 180-degree phase reversal on successive revisits to each scan line in sequential frames. The specific frequency is 455 $f_H/2$ or 3.579545 MHz. A second effect attributed to the color sub carrier being located at an odd multiple of the half-line rate is the checkerboard like perturbation of gray scale in a frame. This can be described as alternating dark, light, dark, light, pattern in one line followed by the complementary light, dark, light, dark, pattern in the next line, the sign of the perturbation is reversed in successive frames. The intensity perturbation phase reversals aid the eye in rejecting the color sub carrier gray scale modulation by permitting temporal, as well as spatial, averaging of the first too dark, then too light incidental gray scale perturbation.

The final signal embedded in the composite video signal is the audio sub carrier placed at 4.5 MHz, the 286-th multiple of the horizontal line rate. This sub-carrier is FM modulated with the audio channel waveform. Originally, this signal was limited to a 15 KHz bandwidth FM modulated with a frequency modulation index of 25 KHz. Modern standards support a stereo signal similar to the format of a standard commercial FM signal placed on this carrier. The new standards also support dual stereo modulation formats. FIG. 1 shows the frequency occupancy of a standard NTSC signal. The same figure shows an added and denoted data channel that represents the data signal to be described in this disclosure.

A conventional television receiver can separate the audio sub carrier from the spectral region containing the video component with simple low-pass and band-pass filters. The luminance and chrominance spectral components of the composite video signal overlap and share common bandwidth hence, conventional low-pass and band-pass filters cannot separate these components.

The spectrum of the video components has a unique structure related to the periodic line scan of the image. The video signal has a line structure at multiples of the line frequency, which are generated by the periodicity of the scanning process. In the absence of video component, the lines are due to the periodic blank and synch signal. The presence of the video signal modulates these spectral lines. Since each scan line is re-visited at a nominal 60 Hz rate the line signal is in fact a sampled data signal with a 60 HZ sample rate.

A video component with small amounts of motion in successive frames modulates the horizontal line components as a spectral cluster containing approximately 20 spectral line pairs with 60 Hz spacing. The bandwidth about each harmonic of the horizontal line rate is thus restricted to approximately 1.2 KHz. The lines are separated by 15.734 KHz thus there are large spectral gaps in the frequency domain description of the video signal. The color sub-carrier located at an odd multiple of the half line rate exhibits a similar line structure with small spectral clusters at multiples of the line rate. These secondary chrominance clusters are located midway between the luminance clusters.

The chrominance clusters and the luminance clusters occupy a common spectral bandwidth but occupy non-overlapped interlaced spectral intervals. These spectral intervals can be separated by the use of comb filters with periodic zeros that suppresses the spectral components clustered about the zeros of the comb filter. One comb filter rejects the luminance and passes the chrominance while the other rejects the chrominance and passes the luminance. Use of the comb filter to separate the two video components is illustrated in FIG. 2.

A video comb filter works in the following manner. Video signals are highly correlated over small spatial displacements in the vertical direction. In other words, adjacent line scans in a normal picture are essentially the same, differing by only small amounts. When the video signal is essentially the same over two successive scan lines, a single line comb filter suppresses the video by delaying the line and then subtracting it from the next line. The comb filter can successfully suppress the video component of the composite NTSC and overlay signal when the video is highly correlated over the time-delay of the comb. When there is significant change between adjacent lines, the line-delay and subtract operation of the comb does not suppress the video. Significant change between lines occurs when there is considerable spatial activity in the image.

When there is low correlation between lines, but high correlation between frames, the line-comb filter can be replaced with a frame-comb filter. The frame comb filter delays the scan lines of an entire frame and then subtracts corresponding lines in adjacent frames. When the lines are the same in successive frames, the cancellation is successful. The pre-equalizer at the modulator must match the comb delay at the demodulator. This frame-to-frame cancellation is effective even when adjacent lines in a frame do not cancel in a line comb filter. The frame based comb filter fails to suppress the video component when there is a scene change between frames or when there is simply high temporal activity (e.g. movement) in the sequence of images.

Line based and frame based comb filter cancellation both fail to suppress the video component of the composite signal when there are high levels of spatial and temporal image activity. Standard recovery from comb filter cancellation failure employs a monitor of image statistics that identifies the temporal regions for which comb filters fail to suppress the video component and disables digital modulation to avoid transmission during the high activity regions. The modulation suppression is also invoked during blanking intervals in the composite video signal to avoid disturbing synch extraction and recovery in standard NTSC receivers.

SUMMARY OF THE INVENTION

The present invention provides a method and system for sending and receiving binary bit streams as an overlay signal in a composite video signal, such as a NTSC signal. The overlay signal is modulated to an offset frequency in the pass-band of the composite video signal and is maintained at a sufficiently low power level to not interfere with the successful demodulation and video display by a conventional color receiver. The spectral co-occupancy of the low level added modulated data signal with the relatively high level NTSC signal leaves the problem of protecting the added digital signal from the NTSC signal. Some protection is afforded by locating the spectrum of the added signal in a spectral region where the video signals exhibit low spectral density. A band pass filter rejects the video spectrum outside the bandwidth of the added signal. Additional rejection of the NTSC signal is obtained by the optional use of one comb filter to place periodic spectral zeros on the luminance spectral clusters and one comb filter to place spectral zeros on the chrominance spectral clusters within the spectral region of the added signal. Since filtering is a linear process, it does not matter in which order the two optional filters are applied to the composite video signal containing the added digital data signal.

The comb filter used to suppress the chrominance and luminance spectral clusters in the received signal bandwidth represents a source of signal distortion in the transmission path of the overlay signal. Since the distortion is completely known, it can be removed with a deterministic pre-equalizer at the transmitter. The pre-equalization at the transmitter is applied only to the added data channel before combining the data channel with the NTSC channel. In this way, the data channel passes through the pair of self-canceling filters, the equalizer and the comb filter, while the NTSC signal is passed only through the comb filter and is thus suppressed in the data channel demodulator. This invention pre-corrects, at the transmitter, the distortion caused by the comb filters at the receiver.

The modulator portion of the system must extract the synchronization information from the NTSC signal with which it will co-occupy spectrum. It does this with standard NTSC synch recovery circuitry that process the composite NTSC signal. The digital modulation is a variant of shaped Orthogonal Frequency Division Modulation (OFDM). The digital modulator forms, for each unique collection of b*M bits, a signal frame comprising M-orthogonal or almost orthogonal narrowband sub-carriers with each sub-carrier quadrature amplitude modulated with b-bits of input data. An IFFT is used to form the OFDM frame. The transform length and the sample rate define the available spectral spacing of the narrowband carriers. Various combinations of sample rate and transform size can be found to obtain desired spectral spacing of the narrowband tones. Spacing can also be controlled by selectively skipping possible center frequencies. Spacing between sub-carriers can as small as the reciprocal frame length, can be multiples of this interval, or can be arbitrarily set in response to other system signal structure considerations. The signal frame spans the interval of an active line, which for an NTSC signal is approximately 50.3 μsec. The reciprocal of this time interval is approximately 19.9 KHz. The sub-carrier signal set can be separated by multiples of the 19.9 KHz. For this condition, the signals are mutual orthogonal since their spectra exhibits $\sin(x)/x$ zeros in the center of each sub-carrier frequency. This mutual orthogonality of the rectangular shaped time frames formed by the input IFFT permits the use of an FFT to decompose the multiple narrowband signals.

The problem with this modulation-demodulation structure is the presence of the overlaid NTSC represents in-band interference to each narrow-band signal. This interference must be suppressed for successful demodulation of the OFDM components. The first aspect of the suppression process is the center frequency to which the OFDM spectral components are translated by a standard I-Q, complex heterodyne. The signal is located in the vicinity of the spectral minima of the gated and windowed composite NTSC signal. This placement assures minimum level of NTSC signal level in the frequency band of the OFDM spectra. The second level of NTSC suppression is the use of the pre-equalization of the OFDM signal at the transmitter and the use of a comb filter to suppress the NTSC signal at the receiver. This processing minimizes the locally correlated temporal components of the NTSC signal. The third level of NTSC suppression is the use of gating and windowing the data frame interval in each active line. As part of the demodulation process, the frame boundaries in each active line, the width of an active line interval, is gated and delivered to the demodulation process. The process in initiated by windowing the frame with a standard spectrum analyzer window such as a Kaiser-Bessel window. Any window with narrow spectral main lobe and low level spectral side-lobes can be used as a gating window in this application. The window suppresses the spectral smearing associated with artificial boundary conditions on each NTSC line scan. The use of the window to suppress the NTSC signal has the effect of widening the spectral response of the FFT decomposition process. We respond to this widening by increasing the spectral separation of the narrowband sub carriers comprising the modified OFDM signal set.

In one embodiment of this invention, the narrowband lines are separated by 3 or 4 times the width of modulated $sin(x)/x$ bandwidth obtained in the OFDM modulation process. These signal frames are in turn translated to a sub carrier centered at the desired spectral region of the NTSC signal. In this embodiment, the modulation and demodulation is performed with efficient DSP techniques that perform pulse shaping, sample rate conversion, spectral translation, comb filter pre-equalization and $sin(x)/x$ pre-distortion correction.

Signal frames span an interval, equal to or less than the width of an active line, which for an NTSC signal is approximately 50.3 μsec. For the remainder of this discussion, assume the frame length is 50.3 μsec. The signal frame is synchronously added to each active line so that the number of signal frames per NTSC frame is approximately 480 frames. The sampled data signal is converted to an analog signal by a digital-to-analog converter and a smoothing filter to suppress undesired spectral components related to the conversion process. A signal combiner that combines the analog modulated signal with the composite video signal in accord with timing information obtained from the sync extraction circuitry. The modulator includes a symbol mapper that generates in-phase and quadrature symbol streams, and a symbol stream combiner that combines the in-phase and quadrature symbol streams according to standard quadrature amplitude modulation techniques.

In accordance with further aspects of the invention, the combiner includes a translator that translates the analog signal centered at an intermediate frequency in the pass band of the composite video signal, and an amplifier that amplifies the translated analog signal.

In accordance with aspects of the invention, the intermediate frequency can be located at any location in the pass band of the composite signal but in this embodiment is between 2 and 3 MHz.

In accordance with further aspects of the invention, the modulator includes an optional pre-equalizer that pre-corrects the generated in-phase and quadrature symbol modulated signal streams to compensate for distortion due to comb filters located in the demodulator. The modulator includes an IFFT and may include a window to spectrally shape in-phase and quadrature symbol streams formed by the IFFT. The IFFT also raises the sample rate from input data rate and frame rate to output sample rate. The IFFT also performs the spectral shaping to compensate for the $sin(x)/x$ spectral distortion contributed by the DAC as the digital data is converted to analog data.

I accordance with other aspects of the invention, the receiver portion contains a full DSP based demodulator to extract the digital data from the overlaid signal. This demodulator includes an analog pre-filter and analog-to-digital converter. The analog filter improves the signal-to-interference ratio of the processed data by limiting the signal bandwidth to that of the data channel bandwidth. Rejection of the NTSC spectral regions that are outside the bandwidth of the data channel has the desired affect of reducing the dynamic range required by the analog-to-digital converter that follows the filter. The bandwidth reduction required to improve the signal-to-interference ratio can also be performed in the sampled data domain after sampling the composite signal subjected only to appropriate analog anti-alias filtering.

A synch extractor extracts synch signals from the original analog signal or from the sampled data signal. A band-pass filter and a single or a pair of comb filters processes the sampled data signal to suppress the spatially correlated components of the composite NTSC signal. A direct digital synthesizer forms the down-conversion mixing signal and a quadrature amplitude demodulator, a comb filter, an FFT, and an adaptive channel equalizer process the signal. A data detector operating in conjunction with timing recovery mechanism forms estimates of the digital parameters of the processed signals. The detected complex data stream is converted to a binary data stream, processed by an error detection and correction block, and then passed to the output port.

In accordance with another aspect of the invention, the demodulator includes a signal processor that suppresses the composite video signal as a preprocessor for extracting the quadrature amplitude modulated data stream, a second signal processor that suppresses channel distortion effects, a window shaping filter to minimize detection errors to the NTSC co-channel signal, an FFT, and a set of complex detector to extract the quadrature amplitude modulated data stream from each carrier in the OFDM signal set. Additionally, the demodulator contains circuitry for processing the composite video signal to extract the synchronization information from the acquired composite video signal.

In accordance with still further aspects of the invention, the demodulator includes a translator that frequency translates the quadrature amplitude modulated data stream to the baseband of the composite video signal.

In accordance with yet another aspect of the invention, the receiver further includes a decoder that decodes the single binary data stream according to forward error correction coding included in the binary data stream.

As will be readily appreciated from the foregoing summary, the invention provides a method and system for modulating binary bit stream information into a composite video signal without causing significant distortion to the video signal or the modulated bit stream information.

BRIEF DESCRIPTION OF THE DRAWINGS

The preferred and alternative embodiments of the present invention are described in detail below with reference to the following drawings.

FIG. 1 is a frequency domain description of the information included in an NTSC signal while FIG. 2 is a frequency domain description of the spectral line clusters related to the periodic time domain scanning structure in the NTSC signal;

FIGS. 3–4, and 7 are block diagrams of the modulation process formed in accordance with the present invention;

FIGS. 5–6 present the relative timing locations and insertion position of the OFDM waveform in the active segment of an NTSC line as well as the spectral structure of the OFDM waveform.

FIGS. 8–10 are block diagrams of the demodulation process formed in accordance with the present invention;

FIG. 11 is an illustration of time and frequency domain effects of gating and windowing active line interval containing overlaid OFDM signal.

FIG. 12 is a block diagram of the data detector and decoder.

FIG. 13 is a flow chart depicting the method of modulating a data signal at a transmitter onto an NTSC signal spectrum as performed by the system shown in FIGS. 3,4, and 7; and, FIG. 14 is a flow chart depicting the method of demodulating a modulated data signal as performed by a receiver system shown in FIGS. 8–10.

DETAILED DESCRIPTION OF THE PREFERRED EMBODIMENT

FIG. 1 shows the frequency spectrum of an NTSC signal 18 that includes a luminance signal 20, a chrominance signal 30, an audio signal 40, and a data channel 50. The luminance signal 20 is the component of the NTSC signal 18 that is the picture component of black and white television. The luminance signal exhibits a 1/f spectrum centered on the selected channel center frequency. The spectrum of the luminance signal is suppressed below the channel center frequency by a vestigal sideband filter so that the luminance signal is delivered as a vestigal sideband (VSB) signal. The chrominance signal 30 is centered at 3.58 MHz and exhibits a 1/f spectral envelope . The chrominance signal 30 is band filtered to a 1.5 MHz bandwidth. Finally, the audio signal 40 is a frequency -modulated signal centered at 4.2 MHz over the assigned channel center frequency with a nominal bandwidth of 50 kHz.

FIG. 1 also shows the proposed location of the data channel 50. The data channel 50 is placed in a spectral region between the chrominance and luminance spectral centers, to minimize the interference with these waveforms. As such, any interference with these luminance and chrominance components is imperceptible to the viewer. Signal energy levels and spectral occupancy are tightly controlled to assure minimal interference. This invention uses a series of signal processing principles to assure recovery of the inserted data channel in spite of the low levels required by the need to prevent interference with the existing NTSC signal.

FIG. 2 illustrates how the energy forming the luminance signal is concentrated in spectral clusters at multiples of the horizontal line rate while the energy forming the chrominance signal is concentrated in clusters located midway between the luminance clusters. FIG. 2 also shows the frequency response of the horizontal line comb filter that places periodic spectral zeros on the luminance spectral clusters to suppress their contribution to the processor used to extract and demodulate the added data channel. A similar horizontal line comb filter places periodic spectral zeros on the chrominance spectral clusters to similarly suppress their contribution to the processor used to extract and demodulate the added data channel FIG. 3 is a block diagram of the modulation process presented in this invention showing the several subassemblies it comprises. These principle components are an NTSC genlock recovery circuit 110; a modulator 120 coupled to the recovery circuit 110; an analog signal conditioning block 130 coupled to the modulator 120; and a resistive combiner 140 coupled to the conditioner 130. The NTSC genlock recovery circuit 110 is similar to synchronization recovery circuits required in standard television receivers and videotape recorders currently available.

To properly modulate a binary data stream into the NTSC video signal, the encoding components of FIG. 3 must be synchronized (sync'd) to the timing information embedded within the video signal (horizontal sync and vertical sync). The genlock recovery circuit 110 receives the video signal and forms pulses synchronized to and coincident with the time positions of the synch and blank pulses in the video signal. The synch pulses are sent to the modulator 120.

The modulator 120 generates sampled data values of an OFDM signal set, quadrature heterodyned to an in-band center frequency and added in the time domain to the active part of the horizontal line. The OFDM signal set carries information extracted from a received binary data stream, and is properly inserted in the line using synchronization information supplied by the genlock recovery circuit 110. After producing the sampled data symbol streams, the modulator 120 pre-equalizes the symbol streams to compensate for the comb filter processing in the demodulator. The sampled data symbol streams are quadrature translated to the selected center frequency and are combined to form samples of a single QPSK (or QAM) signal. The modulator 120 sends the combined stream to the stream conditioner 130. The modulator 120 modulates the binary data frames with an OFDM modulator and then digitally translates to an offset, in-band IF frequency according to standard quadrature heterodyne techniques. The modulator 120 is described in more detail below in FIG. 4.

The signal conditioner 130 converts the combined stream to an analog signal for overlay on the NTSC signal. The signal conditioner 130 frequency translates the analog signal formed by the modulator in order to move the analog signal to an intermediate frequency where the combined signal stream will reside within the NTSC signal. Thus conditioned, the analog signal is overlaid onto the NTSC signal by the resistive combiner 140. The conditioner 130 is described in more detail below in FIG. 7.

As shown in FIG. 4, the modulator 120 includes a data buffer 210, a symbol mapper 220 coupled to the buffer 210, a spectral shaping filter, IFFT, and up-sampler 230 coupled to the mapper 220, a pre-equalizer filter 235, and a sampled data frequency translator and symbol stream combiner 240 following the comb filter equalizer. The binary data stream enters the modulator 120 at the data buffer 210 at a relatively constant rate. The NTSC genlock recovery circuit 110 provides vertical and horizontal synch pulses to assure proper timing. Within the data buffer 210, the data is encoded with a forward error correction (FEC) code (for example, a convolutional coder, an interleaver and a Reed-Solomon coder.).

Once encoded, the data buffer 210 sends the encoded binary data stream to the symbol mapper 220 according to the synch pulses for mapping into binary symbol streams, in order to define the modulation bandwidth and spectral shape. The symbol mapper 220 maps the binary symbol streams into two independent QAM symbol streams; the in-phase, and the quadrature symbol streams to be processed by the following OFDM IFFT modulator.

Because the demodulating system will subject the QAM symbol streams to comb filtering, the precoding filter bank 230 pre-emphasizes those portions of the symbol streams that will be distorted by the later comb filtering. Additionally the precoding filter bank 230 may shape the spectra of the narrowband channels to control inter-symbol interference. The pre-equalized filter bank 235 passes the precoded QAM symbol streams to the symbol stream combiner and frequency translator 240.

The symbol stream combiner and frequency translator 240 adds the translated quadrature signal streams to form samples of a single carrier centered OFDM waveform. The combined symbol stream is then converted to an analog signal and further translated to the appropriate subcarrier frequency for insertion in the spectrum of the co-channel NTSC analog signal.

FIG. 5 shows the relative position of the OFDM signal and the NTSC active line. The OFDM signal is added as a low level signal in the interval bounded by the horizontal blank pulses from the previous and current line. FIG. 6 shows the typical spectral structure of the data channel formed by the OFDM-IFFT modulator. It indicates typical spectral width and spectral separation of the OFDM narrowband spectral bands.

FIG. 7 is a block diagram of the components of the signal conditioner 130. The signal conditioner 130 includes a digital to analog converter 250, a low pass filter 260 coupled to the converter 250, frequency translator 270 coupled to the low pass filter 260, and a variable gain amplifier 280 coupled to the translator 270. The digital to analog converter 250 converts the samples of the single carrier centered OFDM symbol stream received from the symbol stream combiner and frequency translator 240. To cleans the converted symbol stream of its high frequency components, an analog low pass filter 260 filters the converted symbol stream. The frequency translator 270 translates the filtered symbol stream to the intermediate frequencies, approximately 2 to 3 MHz above the NTSC center frequency. The variable gain amplifier 280 controls the amplitude of the translated waveform to establish levels where interference observed in the sequence of images formed by a standard NTSC are acceptably small.

FIG. 8 is a block diagram of a receiving system (demodulator) for demodulating a binary data stream from a NTSC signal as produced by the systems shown in FIGS. 3,4 and 7. The demodulator comprises a signal splitter 310; a signal conditioner 320; and a quadrature amplitude demodulation unit 330.

FIG. 9 is a block diagram of the signal splitter 310. The signal splitter 310 receives an analog composite NTSC broadcast signal with the binary data overlay. The signal splitter 310 includes an analog to digital converter 410, an NTSC signal suppression filter 420 and a data suppression filter 430 coupled to the digital converter 410, an NTSC genlock recovery circuit 440 coupled to the filter 430, and a frame synch extractor 450 coupled to the genlock recovery circuit 440. The analog to digital converter 410 converts the received analog composite NTSC broadcast signal to digital and sends that converted signal along two paths to suppress alternately the data signal and the NTSC composite signal. Where the data signal is suppressed at the data suppression filter 430, the remaining signal arrives at the NTSC genlock extractor 440 that performs the same function as the genlock stripper 110. The frame synch extractor 450 sends synch pulses to the signal conditioner 320.

Along the alternate path, a comb filter, the NTSC signal suppression filter 420, precisely removes the NTSC composite signal. The NTSC video-signal spectrum generated by scanning an image includes energy concentrated near harmonics of the 15,734-Hz line scanning frequency. Additional lower amplitude sideband components exist at multiples of 60-Hz (the field scan frequency) from each line scan harmonic. Almost no energy exists halfway between the line scan harmonics, that is, at odd harmonics of one-half line frequency. The NTSC signal suppression filter 420, removes the precise energy along the harmonics leaving only the QAM data stream. The same treatment removes the audio waveform 40.

Once isolated, the OFDM data stream passes to the signal conditioner 320. FIG. 10 is a block diagram of the signal conditioner 320 that includes a frequency translator 460, a timing recovery unit 470, a carrier recovery unit 480, and a matching filter 490. The offset carrier data stream is frequency translated at the frequency translator 460 to the baseband frequency in order to take advantage of the synch pulses. So translated, the timing recovery unit 470 uses the synch pulses from the frame synchronization extractor 450 to translate the OFDM signal to base-band. The timing recovery unit 470 presents complex base-band signal to the dating and windowing unit 475. The gating and windowing unit strips the active line interval from the NTSC line and applies a window to the interval to help suppress the NTSC component. The gated and windowed signal stream is presented to the FFT 490 for demodulation of the numerous narrow-band spectral components of the OFDM signal frame. Data from an un-modulated sub-carrier in the OFDM signal set is delivered to the carrier recovery unit 480 to synchronization of the carrier signal.

FIG. 11 shows how the window is applied in the time domain to the active segment of the horizontal line in the NTSC signal containing the OFDM data overlay. Also shown is the effect, observed in the frequency domain, of the window applied in the time domain. These effects are seen to be a widening of the spectral narrowband lines due to windowing the OFDM signal and a reduction of the luminance spectrum levels due to gating the horizontal blank pulses, and to windowing the NTSC signal components.

As shown in FIG. 12, the demodulator of the OFDM narrow band signals, unit 330, from FIG. 8 includes signal detectors 510, 520 coupled to a symbol decoder 530, a symbol mapper 540 coupled to the decoder 530, a channel decoder 550 coupled to the mapper 540, and a data buffer 560 coupled to the channel decoder 550. The signal detectors 510, 520 detect the QAM symbol streams in the in-phase and quadrature signals respectively from the OFDM narrow band carriers for mapping the outputs into one of the possible transmitted signals per carrier. The symbol decoder 530 accepts the outputs of the detectors 510, 520 and decodes them by a symbol decoding process. This process entails a mapping of detected levels to a reduced set of levels using residue mapping as part of the pre-equalization correction performed at the modulator and the comb filtering applied at the demodulator. The symbol mapper 540 combines the in-phase and quadrature frames into a single bit stream which is then channel decoded by the channel decoder 550 (using FEC coding techniques) and sent to the data buffer 560 as a binary data stream.

FIG. 13 illustrates an example modulation process performed by the system shown in FIGS. 3,4, and 7. First, at block 605, a binary data stream is received at the modulater from a binary data source. The received binary data stream is buffered for OFDM framing and to allow for intermittent data flow at block 610. Next, at block 615, vertical and horizontal sync pulse information is extracted from NTSC signal received from a signal-broadcasting source, such as a broadcasting network. The binary data stream is FEC encoded and then grouped into binary symbol streams, at blocks 620, 625. The binary symbol streams are mapped into OFDM frame sequences at block 630. Then, at block 635, the OFDM frames are mapped into I-Q data in each selected frequency bin of an IFFT. The separate IQ symbols are filtered, shaped, and up-converted by the IFFT at block 640. The OFDM symbol frame is translated to the predesignated subcarrier frequency, at block 645. Then, at block 650, the translated symbol stream is converted to an analog signal and then filtered, at block 655, to remove high frequency components. Finally, at block 660, the filtered analog signal is combined with the input NTSC video signal.

FIG. 14 illustrates an example demodulation process performed by the system shown in FIGS. 8 and 9. First, at block 705, the NTSC video signal with modulated data stream is received. At block 710, the received signal is converted into two identical digital data streams. Next, at block 715, a first of the two data streams is comb filtered to suppress artifacts related to the NTSC signal. Then, that filtered stream is further filtered to suppress the audio portion of the NTSC signal, at block 720. The frequency is translated into I-Q down converted sampled waveforms with its center at baseband, at block 725. At block 730, the carrier frequency is recovered by adjusting the frequency translation's local oscillator characteristics and by controlling the frequency translation process local oscillator outputting both an in-phase and quadrature signal. At or about the same time as the filtering of the first data stream, the second data stream is filtered to suppress the modulated data stream, at block 750. Then, at block 755 genlock data is extracted from the filtered second data stream. Next, frame synchronization data is assembled from genlock data, at block 760. At block 765, timing outputs are recovered. The in-phase and quadrature signals are demodulated by the gated and windowed FFT at block 770. At block 775, the extracted in-phase and quadrature signals are mapped into an encoded binary data stream and, at block 780, the binary data stream is decoded using the FEC.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. A method for modulating a binary bit stream in a composite video signal, the composite video signal includes luminance, chrominance and audio components, the method comprising:

obtaining sync pulse information from the composite video signal;

modulating the binary bit stream according to a modified orthogonal frequency division modulation (OFDM) technique, the modulating comprising:

generating in-phase and quadrature symbol frames from the binary bit stream;

combining the in-phase and quadrature symbol frames streams according to OFDM modulation techniques; and pre-equalizing the generated in-phase and quadrature symbol streams according to comb filtering effects;

converting the combined symbol frames into an analog signal; and combining the analog signal with the composite video signal according to the obtained sync pulse information.

2. The method of claim 1, wherein combining the analog signal comprises:

translating the analog signal to be centered at an intermediate frequency above the baseband of the composite video signal and at a region of spectral minimum of the video signal; and amplifying the translated analog signal.

3. The method of claim 2, wherein the intermediate frequency is at least 2 MHz.

4. The method of claim 3, wherein the intermediate frequency is less than 3 MHz.

5. The method of claim 1, wherein modulating further comprises: encoding the binary bit stream with forward error correction code.

6. The method of claim 1, wherein the composite video signal is a NTSC video signal and wherein combining the analog signal with the composite video signal comprises time domain gating of the OFDM signal with the active part of the video horizontal line.

7. An apparatus for modulating a binary bit stream in a composite video signal, the composite video signal includes luminance, chrominance and audio components, the apparatus comprising:

a sync pulse stripper configured to obtain sync pulse information from the composite video signal;

a modulator configured to modulate the binary bit stream according to quadrature amplitude modulation, the modulator comprising:

a symbol mapper configured to generate in-phase and quadrature symbol streams;

a symbol stream combiner configured to combine the in-phase and quadrature symbol streams according to quadrature amplitude modulation techniques; and pre-equalizer operating on the generated in-phase and quadrature symbol streams to compensate for comb filtering effects a digital to analog converter configured to convert the combined symbol streams into an analog signal; and a combiner configured to combine the analog signal with the composite video signal according to the obtained sync pulse information.

8. The apparatus of claim 7, wherein the combiner to combine the analog signal comprises:

a translator configured to translate the analog signal to be centered at an intermediate frequency above the baseband of the composite video signal and at a region of spectral minimum of the video signal; and an amplifier configured to amplifying the translated analog signal.

9. The apparatus of claim 8, wherein the intermediate frequency is at least 2 MHz.

10. The apparatus of claim 9, wherein the intermediate frequency is less than 3 MHz.

11. The apparatus of claim 7, wherein the modulator comprises: a filter configured to filter the generated in-phase and quadrature symbol streams according to Nyquist square root filtering techniques.

12. The apparatus of claim 7, wherein the composite video signal is a NTSC video signal and wherein the combiner to combine the analog signal with the composite video signal comprises time domain gating of the OFDM signal with the active part of the video horizontal line.

13. A method for demodulating a binary bit stream modulated in a composite video signal as a gated and windowed orthogonal frequency division modulation (OFDM) offset carrier modulated signal, the composite video signal includes luminance, chrominance and audio components, the method comprising:
- converting the composite video signal modulated with the carrier centered OFDM modulated signal into a digital signal;
- splitting the digital signal into synch pulses and a quadrature amplitude modulated data stream;
- gating the active video line interval and applying a window to the interval to help suppress the video signal components;
- separating the offset OFDM modulated data stream into in-phase and quadrature symbol frames streams according to the synch pulses; and
- combining the in-phase and quadrature demodulated symbol frames into a single binary data stream.

14. The method of claim 13, wherein splitting comprises:
- suppressing the composite video signal for attaining the offset OFDM modulated data stream;
- suppressing the offset OFDM modulated data stream for attaining the composite video signal; and
- extracting the synch pulses from the attained composite video signal.

15. The method of claim 13, wherein separating comprises:
- frequency translating the offset OFDM modulated data frames to the baseband of the composite video signal.

16. The method of claim 13, further comprising: decoding the single binary data stream according to forward error correction coding included in the binary data stream.

17. The method of claim 13, wherein the composite video signal is a NTSC video signal.

18. A receiver for demodulating a binary bit stream modulated in a composite video signal as an offset orthogonal frequency division modulation (OFDM) modulated signal, the composite video signal includes luminance, chrominance and audio components, the receiver comprising:
- an analog to digital converter configured to convert the composite video signal modulated with the offset OFDM modulated signal into a digital signal;
- a gating and windowing unit operating on the digital signal;
- a splitter configured to split the digital signal into synch pulses and an I-Q OFDM modulated data stream;
- a separator configured to separate the offset OFDM modulated data frame into in-phase and quadrature symbol frames according to the synch pulses; and
- a combiner configured to combine the in-phase and quadrature data frames into a single binary data stream.

19. The receiver of claim 18, wherein the splitter comprises:
- a first signal suppressor configured to suppress the composite video signal for attaining the I-Q OFDM modulated data stream;
- a second signal suppressor configured to suppress the I-Q OFDM modulated data stream for attaining the composite video signal; and
- an extractor configured to extract the synch pulses from the attained composite video signal.

20. The receiver of claim 18, wherein the separator comprises: a translator configured to frequency translate the I-Q OFDM modulated data frame to the baseband of the composite video signal.

21. The receiver of claim 18, further comprising: a decoder configured to decode the single binary data stream according to forward error correction coding included in the binary data stream.

22. The receiver of claim 18, wherein the composite video signal is a NTSC video signal.

* * * * *